US 7,088,495 B2

(12) United States Patent
Trepagnier et al.

(10) Patent No.: US 7,088,495 B2
(45) Date of Patent: Aug. 8, 2006

(54) METHOD AND APPARATUS FOR TIME-DIVISION MULTIPLEXING TO IMPROVE THE PERFORMANCE OF MULTI-CHANNEL NON-LINEAR OPTICAL SYSTEMS

(75) Inventors: Pierre C. Trepagnier, Medford, MA (US); Philip D. Henshaw, Carlisle, MA (US); Robert F. Dillon, Stoneham, MA (US)

(73) Assignees: Sparta, Inc., Lake Forest, CA (US); Lumen Laboratories, Inc., Burlington, MA (US)

( * ) Notice: Subject to any disclaimer, the term of this patent is extended or adjusted under 35 U.S.C. 154(b) by 63 days.

(21) Appl. No.: 10/449,236

(22) Filed: May 30, 2003

(65) Prior Publication Data
US 2004/0114211 A1 Jun. 17, 2004

Related U.S. Application Data

(60) Provisional application No. 60/385,368, filed on Jun. 3, 2002.

(51) Int. Cl.
*G02F 1/35* (2006.01)
*H04J 14/08* (2006.01)

(52) U.S. Cl. ............................ 359/326; 398/52; 398/98
(58) Field of Classification Search ........ 359/326–332; 398/52–54, 98, 101
See application file for complete search history.

(56) References Cited

U.S. PATENT DOCUMENTS

| | | | |
|---|---|---|---|
| 4,455,643 A * | 6/1984 | Smith et al. | 398/45 |
| 5,060,305 A * | 10/1991 | Prucnal et al. | 398/53 |
| 5,402,256 A * | 3/1995 | Spanke | 398/53 |
| 5,404,222 A | 4/1995 | Lis | |
| 5,572,350 A * | 11/1996 | Spanke | 398/54 |
| 5,604,618 A * | 2/1997 | Mori et al. | 398/150 |
| 5,991,033 A | 11/1999 | Henshaw et al. | |
| 6,215,570 B1 * | 4/2001 | Ellis et al. | 398/154 |
| 6,356,370 B1 * | 3/2002 | Damen et al. | 398/92 |
| 6,788,839 B1 * | 9/2004 | Litvin | 385/16 |
| 6,870,663 B1 * | 3/2005 | Kato et al. | 359/326 |

OTHER PUBLICATIONS

K. Uchiyama et al, "100Gbit/s Multiple-Channel Output All-Optical Demultiplexing Based On TDM-WDM Conversion In A Nonlinear Optical Loop Mirror", Electronics Letters, vol. 32, No. 21, Oct. 10, 1996, pp. 1989-1991.*
Hopf, et al., Second-harmonic interferometers, Optical Society of American, May 28, 1980, Optics Letters, vol. 5, No. 9, pp. 386-388.

* cited by examiner

*Primary Examiner*—John D. Lee
(74) *Attorney, Agent, or Firm*—Thomas J. Engellenner; Reza Mollaaghababa; Nutter McClennen & Fish LLP (57) ABSTRACT

The present invention generally provides systems and methods for distribution of radiation among a plurality of optical channels, each of which can include a non-linear optical element. An optical system of the invention can include a source for generating radiation and an optical time-division multiplexer that can deflect, at any given time interval, the radiation into one of a plurality of optical channels.

15 Claims, 9 Drawing Sheets

METHOD AND APPARATUS FOR TIME-DIVISION MULTIPLEXING TO IMPROVE THE PERFORMANCE OF MULTI-CHANNEL NON-LINEAR OPTICAL SYSTEMS

RELATED APPLICATIONS

The present application claims priority to a provisional application having a Ser. No. 60/385,368, filed on Jun. 3, 2002, and herein incorporated by reference.

BACKGROUND OF THE INVENTION

The present invention relates to systems and methods for distributing radiation among a plurality of optical channels, and more particularly, to such systems and methods that more efficiently distribute light among optical channels containing non-linear optical elements.

In many modern optical systems, such as fiber-based telecommunications networks and optical interferometers, an input optical signal from a light source is typically split among multiple channels containing non-linear optical elements to drive these elements. These multiple channels then operate in parallel to provide increased capability according to the design of the systems. Such systems often suffer from errors induced by low signal levels in these optical channels as a result of the characteristics of the non-linear optical elements, e.g., relatively low conversion efficiency, and the reduction in light intensity in each channel relative to the original light intensity before its split among the channels. These limitations force system designers to increase the cost and complexity of the detector systems that receive the output signals from the non-linear optical elements.

Figure 1:
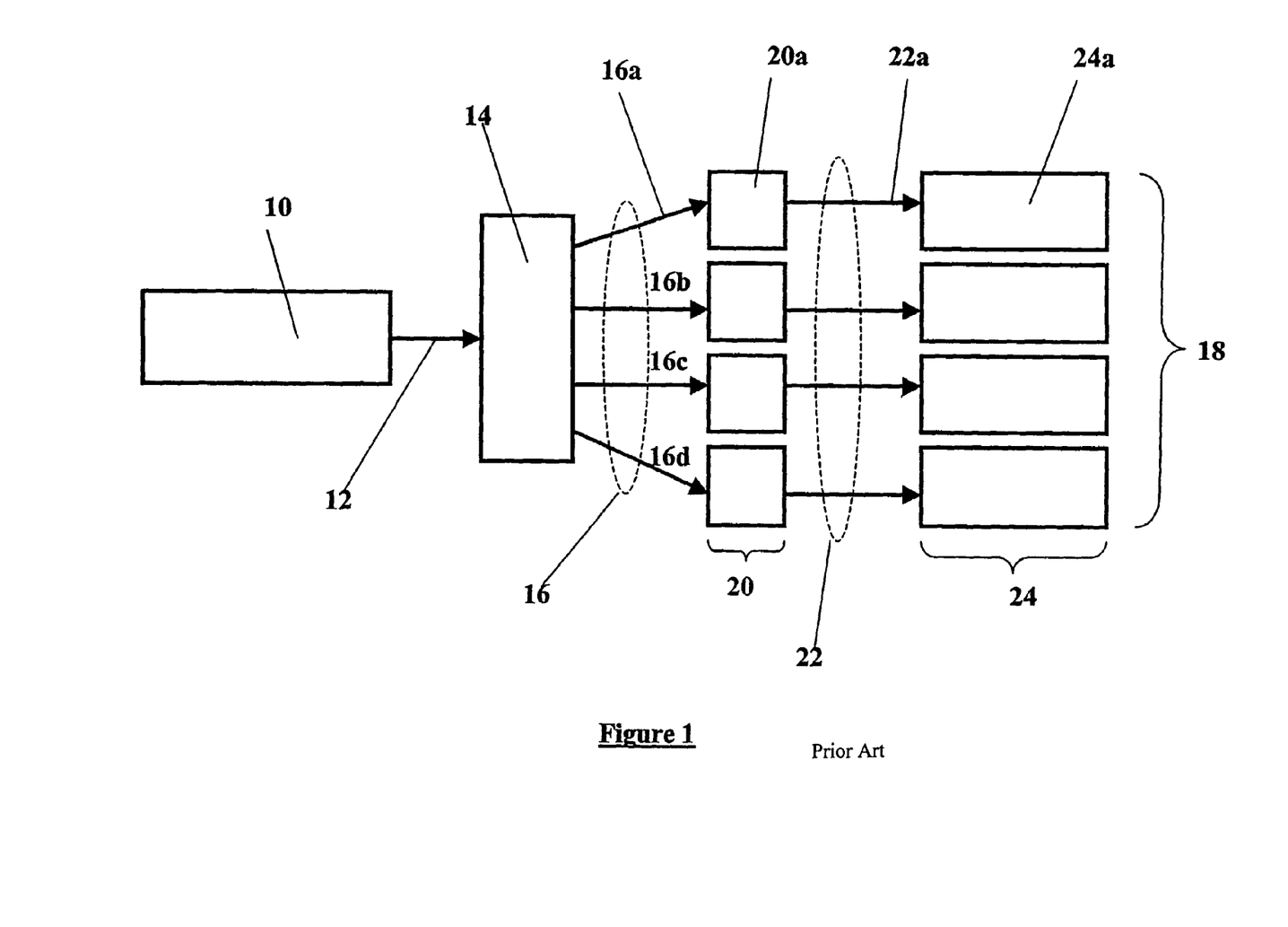
FIG. 1 schematically depicts a prior art optical system for distributing radiation among a plurality of optical channels, FIG. 2A schematically depicts an optical system according to the teachings of the invention for distributing radiation among a plurality of optical channels, and more particularly illustrates the state of the optical system at a time $T_0$.

As exemplary illustration of the shortcomings of such prior art systems, FIG. 1 schematically depicts such a prior art system having a light source 10 that emits a beam of light 12 that, for sake of illustration, is assumed to contain one unit of peak optical power. A beam splitter arrangement 14 divides the source beam 12 into multiple intermediate beams 16a, 16b, 16c, and 16d, herein collectively referred to as intermediate beams 16. Any single intermediate beam 16 contains a peak optical power that is 1/N times less than the peak optical power in the source beam 12, where N is the number of intermediate beams, here shown as four. The multiple intermediate beams 16 in turn drive multiple optical channels 18, which include non-linear elements 20, output beams 22 and optics 24 that receive the output beams 22.

Let us now examine the action within a single channel. The intermediate beam 16a contains a peak optical power that is significantly less than the peak power in the source beam 12. This can result in the non-linear optical module 20a delivering an output beam 22a to the receiving optics 24a that is significantly lessened relative to the case where the full power of the source beam 12 is supplied to the non-linear element 20a. To further illustrate this point, consider the non-linear element 20a to be a harmonic doubling crystal that can provide an output beam 22a having a peak optical power that is proportional to the square of the peak power of the intermediate beam 16a. Hence, the peak power of the output beam 22a will be $(1/N)^2$ times lower than that obtained in an arrangement in which the undivided source beam 12 drives the non-linear element 20a.

Further examples of such limitations of prior art systems can be found in contemporary systems for performing optical interferometry. Distance-measuring interferometers (DMI) have many industrial uses, such as positioning wafers in photolithography systems during the production of integrated circuits. For example, multiple DMI beams are typically used to measure the position and rotation angles of a stage on which a silicon wafer resides. One of the most important sources of error in DMI subsystems relates to variations in the refractive index of the air caused by atmospheric disturbances (pressure and temperature fluctuations).

A Second Harmonic Interferometer (SHI) provides a practical solution for measuring these air-induced disturbances and correcting them in real time. See, e.g., Hopf, et al., "Second-harmonic interferometers", *Optics Letters*, 5:386–388, (1980). An SHI system with applications to photolithography is the subject of U.S. Pat. Nos. 5,404,222 and 5,991,033. Localized air fluctuations require monitoring in the immediate neighborhood of each DMI beam in an interferometer system that, in the case of integrated circuit fabrication, may comprise dozens of beams. SHI subsystems use a laser source to pump harmonic generation crystals at each beam location. These crystals create coherent beams at double the frequency of the incident laser light with a phase that is matched to the incident light. Frequency doubling is not efficient, and often very little second harmonic radiation is obtained, thus limiting the SHI system's signal-to-noise ratio and hence the accuracy of the measurement. Because the efficiency of a frequency doubler rises as the power density of an incident laser beam, its performance is very sensitive to the incident power. Each beam division, thus results in a quadratic diminishing of doubler output, and a resultant degradation of the signal to noise performance of the SHI. In the current state of the art, monitoring multiple interferometer beams requires many expensive lasers, or even more expensive high-power lasers and beam-splitters to divide up a single laser beam.

Hence, there is a need for an improved apparatus and method for distribution of light among a plurality of optical channels.

There is also a need for improved apparatus and method that allow efficient operation of a plurality of optical channels having non-linear optical elements while lowering of the complexity and cost associated with signal detection in such optical channels.

There is also a need for improved second harmonic interferometers and multi-wavelength fluorescence spectrometers.

SUMMARY OF THE INVENTION

The present invention provides an optical system that can include a radiation source, and an optical time-division multiplexer that is optically coupled thereto to receive radiation generated by the source. The optical system further includes a plurality of optical channels, at least one of which contains a non-linear optical element, such as a frequency doubler. During each of a plurality of time intervals, a controller can cause the multiplexer to shift the radiation received from the source into one of the optical channels.

In a related aspect, the optical system includes a plurality of detectors, each of which detects the radiation propagating through one of the optical channels. The optical system can also include a beam combiner that receives radiation from the optical channels and direct the received radiation into a common propagation direction as a combined beam. A single detector can then be utilized to detect the combined beam.

In a related aspect, the radiation source, e.g., a pulsed laser, can generate a plurality of optical pulses that are incident on the multiplexer. The multiplexer deflects each pulse to one of the optical channels based on the arrival time of that pulse at the multiplexer.

In other aspects, the invention provides an optical interferometer that includes a radiation source for generating a plurality of temporally-separated pulses having a selected fundamental frequency. A time-division multiplexer receives these pulses and diverts each pulse into at least one of two optical paths based on the arrival time of that pulse at the multiplexer. A non-linear doubler converts a first portion of each pulse propagating in one of the optical paths into radiation at a second harmonic of the fundamental frequency. The pulses propagate from the doubler through an active region to a reflector that reflects the pulses back to the doubler for a second traversal therethrough. The second traversal of the pulses through the doubler causes the conversion of a second portion of each pulse from the fundamental frequency to a second harmonic frequency. Subsequently, another reflector reflects each returning pulse to one of a plurality of phase detectors, each of which measures a phase difference between the two harmonic portions of one of the pulses. A processing module can receive this phase information to determine a measure of refractivity in the active region.

In a related aspect, the invention provides an interferometer similar to that described above that employs a single phase detector rather than a plurality of phase detectors. More particularly, such an interferometer according to one aspect of the invention can include a focusing lens that focuses all returning pulses onto a common focal plane at which a single phase detector is disposed. For each pulse, the phase detector can determine the phase difference between the two second harmonic portions of the pulse, and transmit this phase information to a processing module for analysis.

In another aspect, the invention provides a multi-wavelength fluorescence spectrometer that includes a light source for generating radiation at a selected wavelength, and a time-division multiplexer that receives this radiation and diverts it, during a given time interval, into one of at least two optical channels. A second harmonic doubler disposed in one of the optical channels operates on radiation propagating in that channel to generate a second harmonic beam, and a third harmonic generator disposed in the other optical channel operates on radiation propagating in that channel to generate a third harmonic beam. A beam combiner directs the second and the third harmonic beams onto a common propagation direction as a combined beam towards a sample holder in which a sample, for which fluorescence measurement is desired, can be disposed. The combined beam can excite the sample to elicit fluorescence radiation therefrom.

In a related aspect, a fluorescence spectrometer of the invention as described above can include collection optics for collecting fluorescence radiation emitted from the sample in response to the excitation radiation. Such collection optics can include, for example, a lens that can collect at least a portion of the emitted fluorescence radiation, and a portion of the excitation radiation, if any, scattered by the sample. The collection optics can further include a filter that substantially removes the scattered excitation radiation to generate a fluorescence beam. A grating can disperse the fluorescence beam, and a detector can detect the dispersed fluorescence radiation. A processing module, electrically coupled to the detector, can then analyze the detected fluorescence radiation to calculate, for example, fluorescence lifetime and intensity.

In other aspects, the invention provides a method for distributing radiation to a plurality of optical channels, each of which can include a non-linear optical element, by directing the radiation to an optical time-division multiplexer that diverts the radiation, for each of a plurality of time intervals, into one of the optical channels so as to generate a plurality of optical pulses that propagate through the channels. Each optical pulse can advantageously exhibit a peak intensity that is substantially equal to a peak intensity of the radiation that is incident on the multiplexer.

Further understanding of the invention can be obtained by reference to the following detailed description in conjunction with the associated drawings that are briefly described below.

BRIEF DESCRIPTION OF THE DRAWINGS

FIG. 2B illustrates the state of the system of FIG. 2A at a time $T_0+\Delta t$, FIG. 3 schematically illustrates another optical system according to the teachings of the invention that employs a time-division multiplexer for distributing light among a plurality of optical channels, FIG. 4 schematically illustrates a prior art second harmonic interferometer, FIG. 5 schematically illustrates a second harmonic interferometer according to the teachings of the invention, FIG. 6A schematically depicts one exemplary implementation of a time-division multiplexer suitable for use in the practice of the invention, FIG. 6B schematically depicts another exemplary implementation of a time-division multiplexer suitable for use in the practice of the invention, FIG. 7 schematically depicts yet another exemplary implementation of a time-division multiplexer suitable for use in the practice of the invention, and FIG. 8 schematically illustrates a multi-wavelength fluorescence spectrometer in accordance with the teachings of the invention.

DETAILED DESCRIPTION OF THE INVENTION

The present invention relates generally to systems and methods for efficiently distributing radiation among a plurality of optical channels, at least one of which can include a non-linear element, such as a frequency doubler. More particularly, a system of the invention can utilize a time-division multiplexer to selectively divert an incoming light beam, at any given time interval, to one of a plurality of optical channels such that the peak light intensity in that optical channel is substantially similar to the peak light intensity of the incoming beam. The term "optical channel" as used herein refers to an optical path through which optical radiation passes between two points. An optical channel can include one or more optical devices, such as non-linear optical elements, that operate on the light propagating through the optical channel.

Figure 2A:
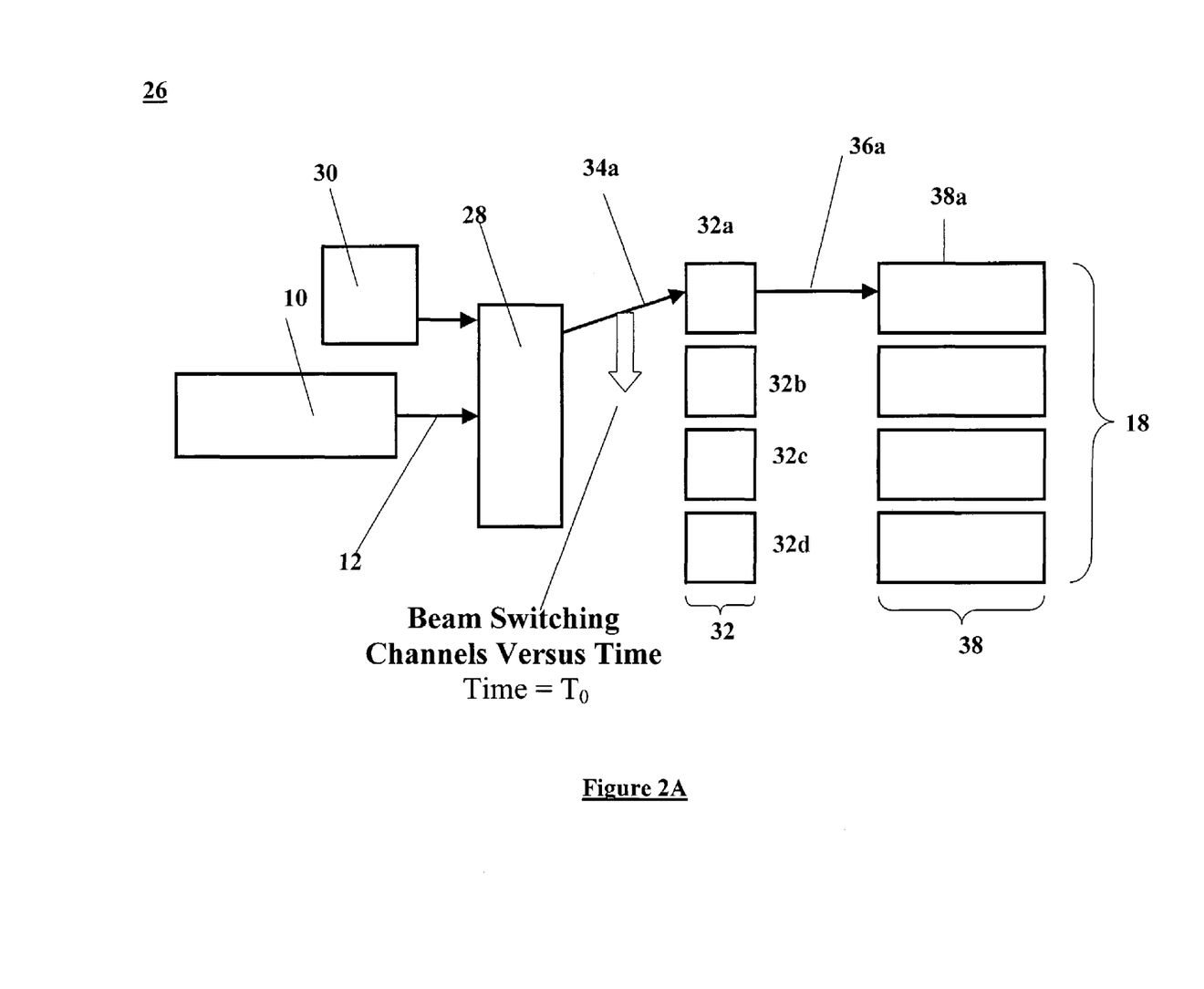

FIG. 2A schematically illustrates an optical system 26 according to the teachings of the invention that includes a light source 10, e.g., a laser, that delivers a source beam 12 to an input port of a time division multiplexer 28 operating under the command of a control system 30. The terms "light" and "radiation" are used herein interchangeably and generally refer to electromagnetic radiation having one or more spectral components in a desired portion of the electromagnetic spectrum. The light source 10 can be either a coherent, e.g., a laser, or a non-coherent source of radiation. During each of a plurality of time intervals, the multiplexer 28 diverts the incoming beam 12 towards one of the non-linear optical elements 32a, 32b, 32c, and 32d, herein collectively referred to as non-linear optical elements 32.

For example, FIG. 2A depicts the state of the system at a time $T_0$ at which the multiplexer 28, under the command of the controller 30, shifts the incoming light beam from its original propagation direction into an intermediate beam 34a propagating in a top optical channel in which the non-linear optical element 32a is disposed. The intermediate beam 34a exhibits a peak intensity that is substantially the same as the peak intensity of the incoming beam 12. For example, the peak intensity of the intermediate beam can differ from that of the incoming beam 12 by only a few percent, for example, as a result of intrinsic losses associated with the multiplexer 28. The non-linear element 32a operates on the intermediate beam 34a to generate a single output beam 36a that is directed to one of the receiver modules 38, namely, receiver module 38a. Hence, at any given time, the multiplexer 28 operates as an optical switch under the command of control system 30 to direct a single intermediate beam to a unique non-linear element, thereby driving that non-linear element with substantially all of the peak power in the source beam 12.

Figure 2B:
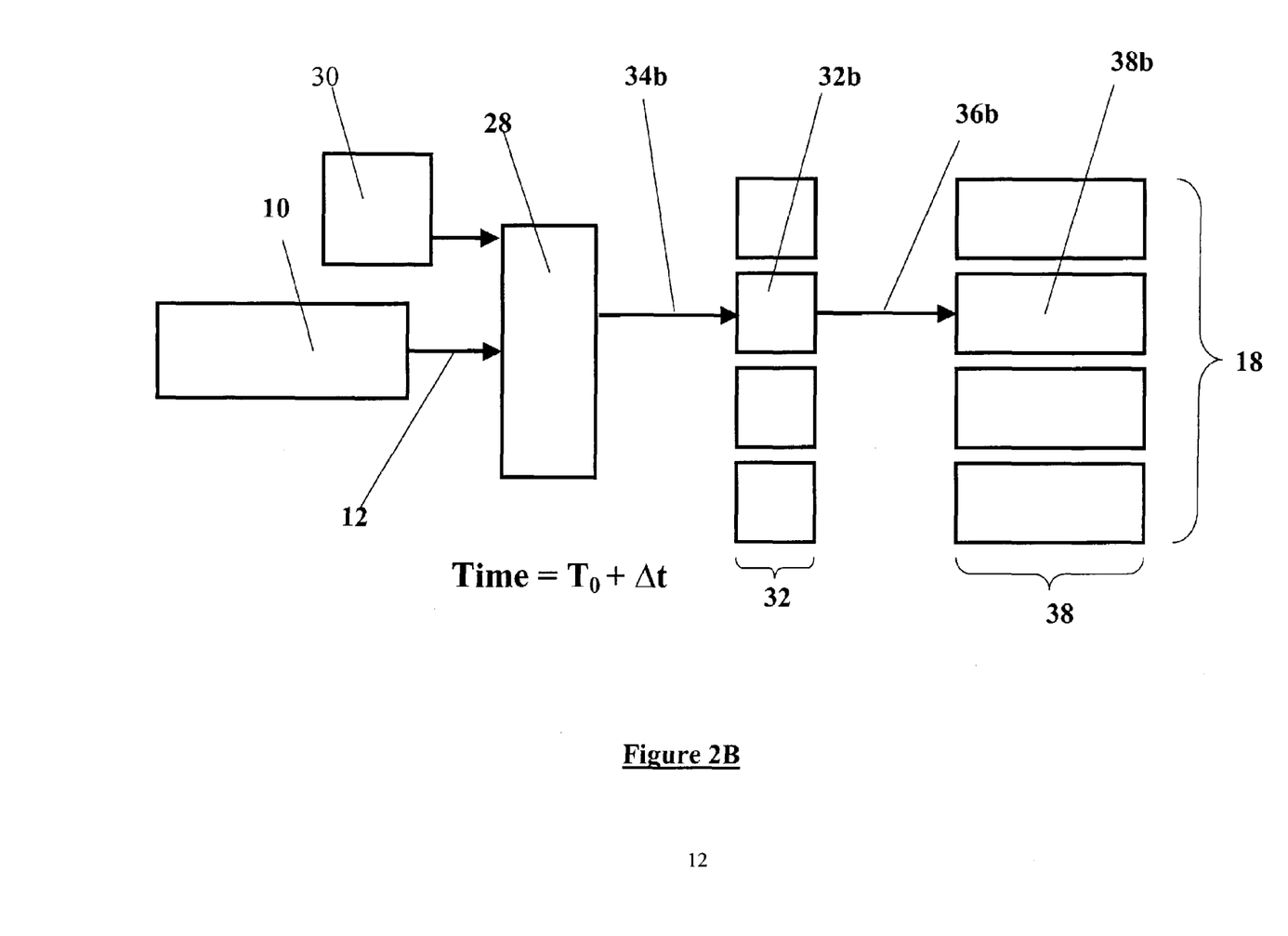

FIG. 2B schematically depicts the system's state at a short time later $T_0 + \Delta t$ after the control system 30 has changed the state of the multiplexer 28 to divert the incoming light beam 12 into a different optical channel, namely, an optical channel in which the optical element 32b is disposed. Hence, at this later time, the intermediate beam 34b is incident on the non-linear optical element 32b that operates thereon to generate an output beam 36b that is directed to another one of the receiver modules 38, namely, the receiver module 38b. In this manner, each of the optical channels having one of the non-linear elements 32 can be driven over time, albeit at different time intervals, with the concomitant advantage over prior art systems, such as that described in connection with FIG. 1, that the peak power in the output beam is not diminished by a factor of $(1/N)^2$, where N denotes the number of optical channels. Furthermore, the output beam's average power is only diminished by a factor of $1/N$ relative to the source beam's average power, whereas, in the prior art system depicted in FIG. 1, it is diminished by $(1/N)^2$ relative to the source beam's average power.

With continuing reference to FIGS. 2A and 2B, the control system 30 can cause the multiplexer to divert the incoming light beam 12 to different optical channels based on a variety of different temporal criteria. For example, the control system 30 can command the multiplexer to dwell differing amounts of time at each channel, permitting the signal-to-noise ratio of individual channels to be varied, if desired. Also, if the light source is a pulsed laser, the multiplexer switching can be synchronized with the laser pulsing to most efficiently pump the non-linear elements.

Figure 3:
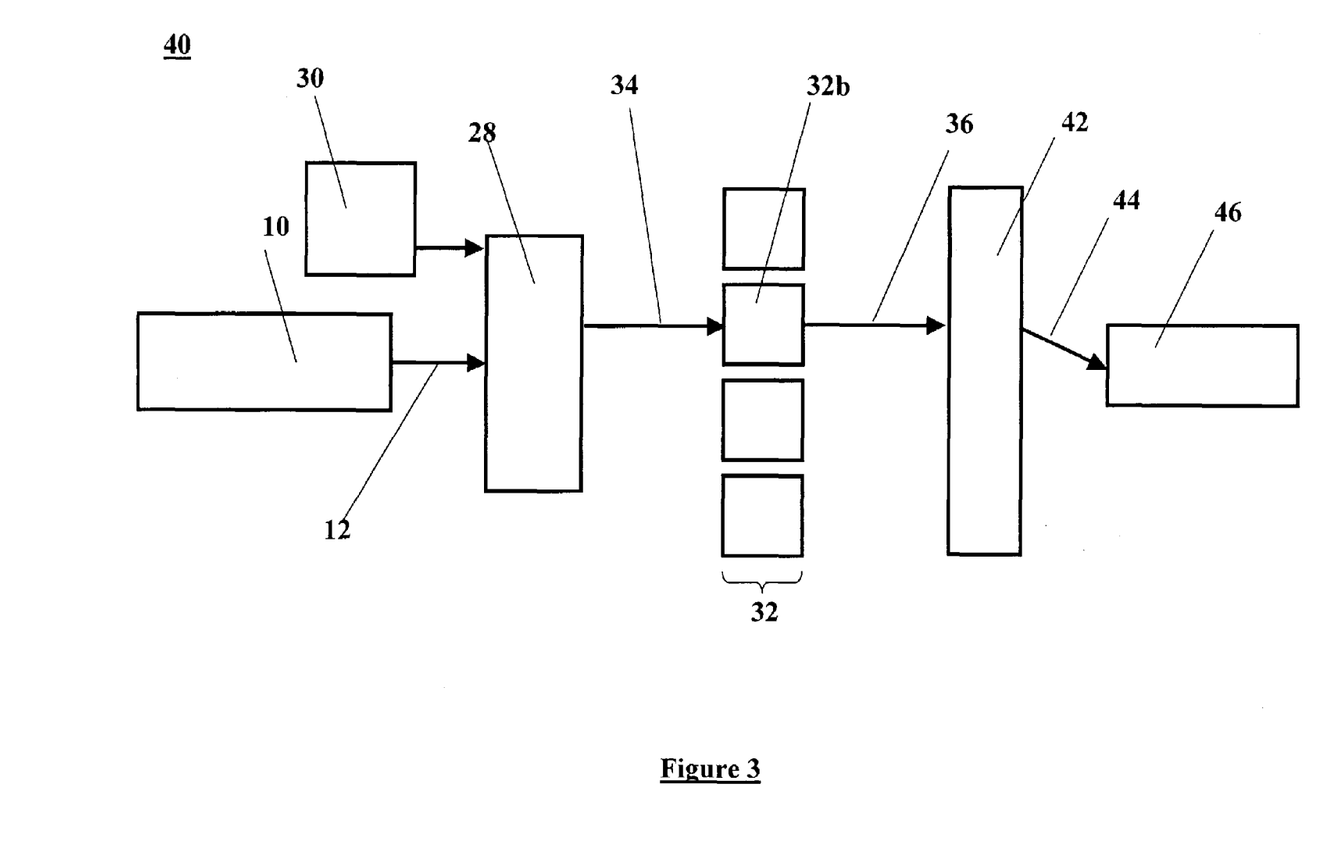

Referring to FIG. 3, another optical system 40 in accordance with the teachings of the invention includes a light source 10 that emits a source beam 12 as an input light beam to the time division multiplexer 28 operating under the control of the system controller 30. Similar to the previous embodiment, the multiplexer 28 diverts the incoming beam to form a single intermediate beam 34 directed to a selected one of the plurality of non-linear elements 32, for example, the non-linear optical element 32b, based on the arrival time of the incoming beam at the multiplexer. Subsequent to traversing the selected optical element, the intermediate beam impinges on a beam combiner element 42 that generates an output beam 44. The beam combiner 44 directs the output beam to a single receiver element 46, independent of the optical channel in which the intermediate beam 34 is traveling Because the various optical channels are time-multiplexed, the single receiver 46 can capture, and separate versus time, the information arriving from all of the channels.

The use of the beam combiner 42 allows utilizing a single receiver, thus advantageously lowering the cost and complexity of the receiver optical system. In addition, the use of a single receiver can advantageously allow employing simpler and less costly data acquisition and processing architectures.

The beam combiner element 42 can be, for example, a lens. In such a case, the receiver 46 can be placed at the focal plane of the lens to collect radiation propagating through any of the optical channels. In embodiments in which the non-linear elements generate different wavelengths of output light, the beam combiner can be implemented by employing an optically dispersive element, such as a grating or prism(s). In other embodiments, arrangements of optical fibers or light pipes (waveguides) can be used for implementing the beam combiner 42.

An optical system of the invention can be utilized in a variety of different applications. By way of example, various embodiments of the invention in the fields of interferometry and spectroscopy are described below. Those having ordinary skill in the art will readily appreciate that an optical system of the invention can also be utilized in other fields, such as telecommunications or any system utilizing non-linear optical elements whose conversion efficiency rises with increasing field-strength.

In one exemplary embodiment of the invention, multiple parallel beams are created for a Second Harmonic Interferometer (SHI) and are then detected and analyzed according to the practice of the invention.

Figure 4:
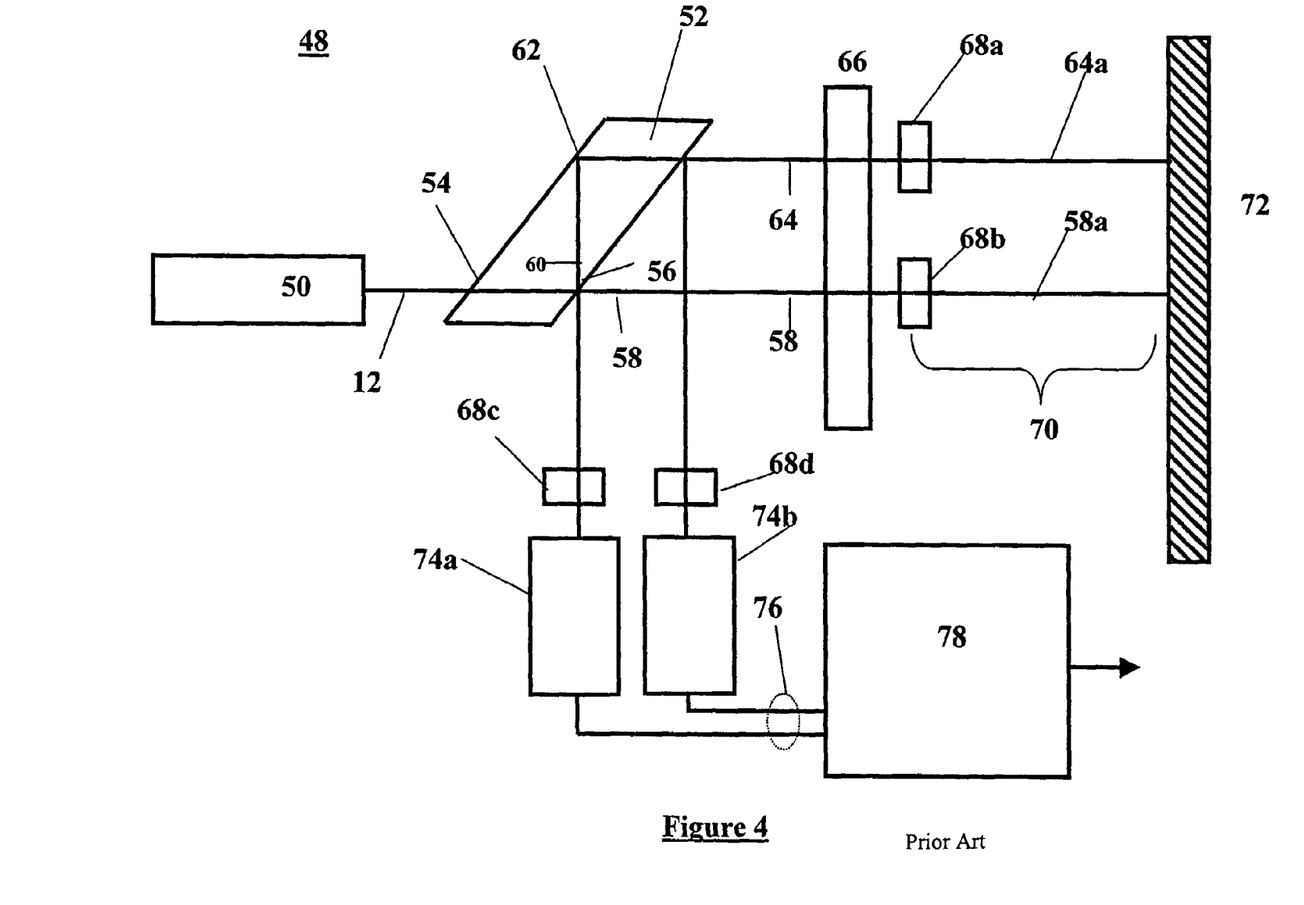

By way of background, FIG. 4 schematically depicts a prior-art SHI 48 in which a pulsed laser 50 emits a pulsed beam of light 12 at a wavelength of 532 nm. The beam 12 enters a beam splitter and harmonic separator 52 through an anti-reflective coated surface 54, and is split at 50% transmissive surface 56 into two beams 58 and 60, each having half of the original power of the beam 12. The beam 60 strikes a highly-reflective surface 62 where it is turned 90 degrees to form beam 64, which is parallel to and separated from beam 58.

The two beams 58 and 64 then form the input beams for two essentially independent Second Harmonic Interferometers. More particularly, the beams 58 and 64 pass through a frequency doubler 66 that doubles the frequency of at least a portion of each beam. That is, each of output beams 58a and 64a includes two frequency components, one of which is the original 532 nm wavelength and the other is the second harmonic component at 266 nm. Subsequently, the beam 58a and 64a, after passing through retardation plates 68a and 68b that rotate each beam's polarization, propagate through an active region 70 towards a mirror 72. For each beam 58a and 64a, the mirror 72 reflects both the 532 nm wavelength component and the 266 nm component back through the retardation plates 68a/68b into the doubler 66. The doubler 66 upconverts at least a portion of the 532 nm component of each reflected beam into another 266 wavelength component, but one which has passed through the active region 70 as a 532 nm component, and hence leads in phase the original 266 nm component slightly. The splitter and harmonic separator 52 directs the 266 nm component of one of the reflected beams to a retardation plate 68c, and directs the 266 component of the other beam to another retardation plate 68d. Subsequently, phase detection electronics modules 74a and 74b measure, respectively, the phase difference between the two 266 nm components of the reflected beams. The phase information is passed through twin cables 76 into signal processing electronics module 78 that converts it into a measure of refractivity in the active region 70. Note that signal processing electronics 78 is designed to process two sets of phase information simultaneously.

Figure 5:
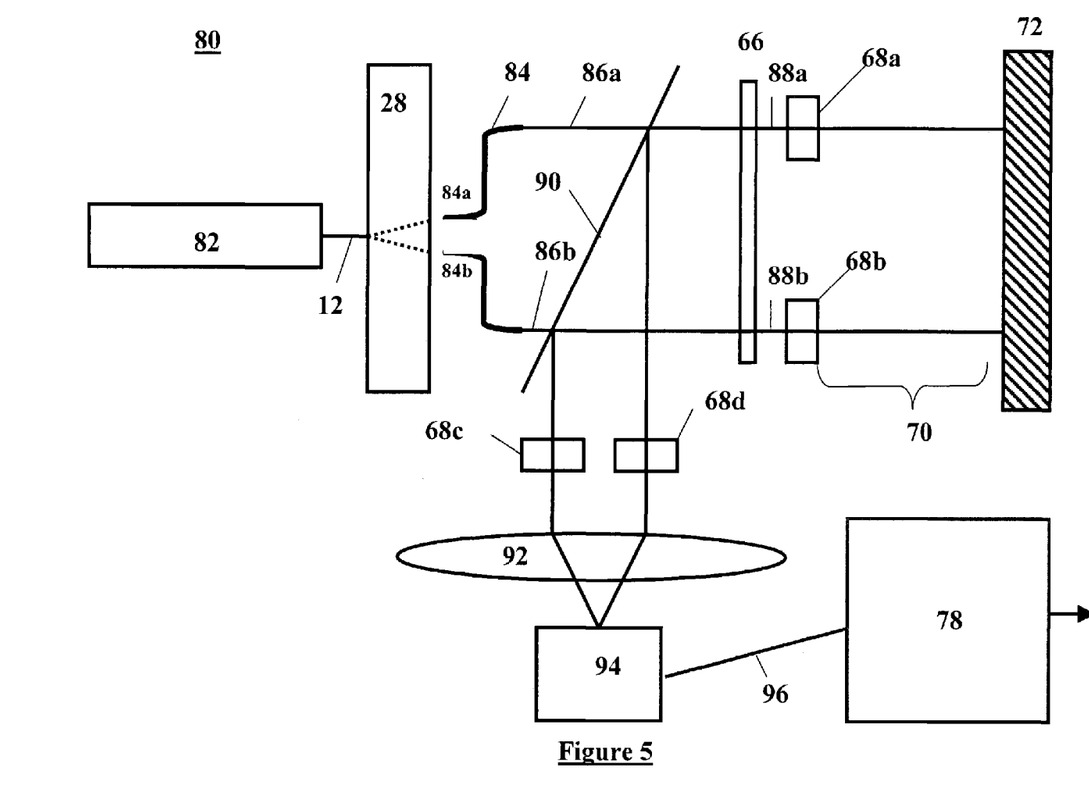

FIG. 5 schematically depicts an SHI 80 in accordance with the teachings of the invention that creates two parallel SHI beams, but with the beams separated in time. The exemplary SHI 80 includes a pulsed laser 82 that emits a pulsed beam of light 12 at 532 nm. The pulse rate can be relatively low, preferably between 4000 and 8000 Hz. The beam 12 enters a time division multiplexer optical switch 28 that sends alternate pulses through an upper branch 84a and a lower branch 84b of a light pipe, optical fiber, or photonic crystal fiber 84 to form two parallel and separated beams 86a and 86b. Note that photons are split between the beams pulse-by-pulse, so that each beam now has a pulse rate equal to one-half the initial pulse rate. Unequal split ratios can also be employed to generate beams with different signal-to-noise ratios.

Unlike the prior-art case, these two beams do not result in two essentially independent Second Harmonic Interferometers, as they are re-combined later. More particularly, the beams 86a and 86b pass through a frequency doubler 66 to create co-linear, but spatially separated, beams 88a and 88b, each having a 266 nm wavelength component. Each beam 88a and 88b also includes a portion of the original 532 component that has not been upconverted by the doubler. The frequency doubler 66 can be thinner, and hence less expensive, than that of the prior-art SHI depicted in FIG. 4, or it can have the same thickness and achieve roughly four times higher 266 nm output per pulse and hence better signal-to-noise ratio.

The beams 88a and 88b pass through retardation plates 68a and 68b, respectively, that rotate their polarizations, and propagate through an active region 70 to a mirror 72 that reflects the beams back towards the frequency doubler 66. More particularly, at mirror 72, both the 532 nm and 266 nm components of each beam are reflected back through one of the retardation plates 68a or 68b and into the doubler 66, where at least a portion of the 532 nm component doubles again to form another 266 nm component, but one which has passed through the active region 70 as a 532 nm component, and hence leads the original 266 nm component slightly in phase.

These returning beams hit a harmonic separator 90 that directs the 266 nm component of each beam into one of twin retardation plates 68c and 68d. After passing through the retardation plates 68c and 68d, a focusing lens 92 focuses the beams onto a single unit of phase detection electronics module 94. Thus, the lens 92 generates a recombined beam having the same pulse rate as the original laser beam. Hence, a single set of electronics can handle both returning beams. The phase information obtained by the phase detection module 94 is passed through a single cable 96 to a signal processing electronics module 78 that employs the phase information to generate a measure of refractivity in the active region 70. Note again that signal processing electronics 78 need be sized only to process one set of phase information at the original laser pulse rate.

Figure 6A:
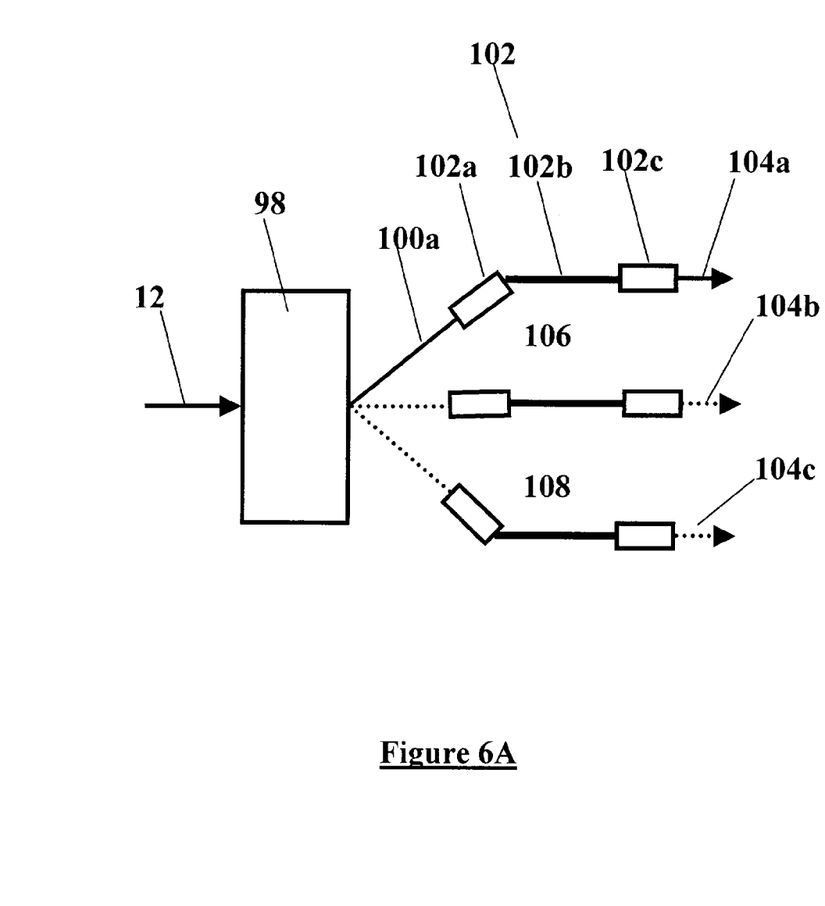
Figure 6B:
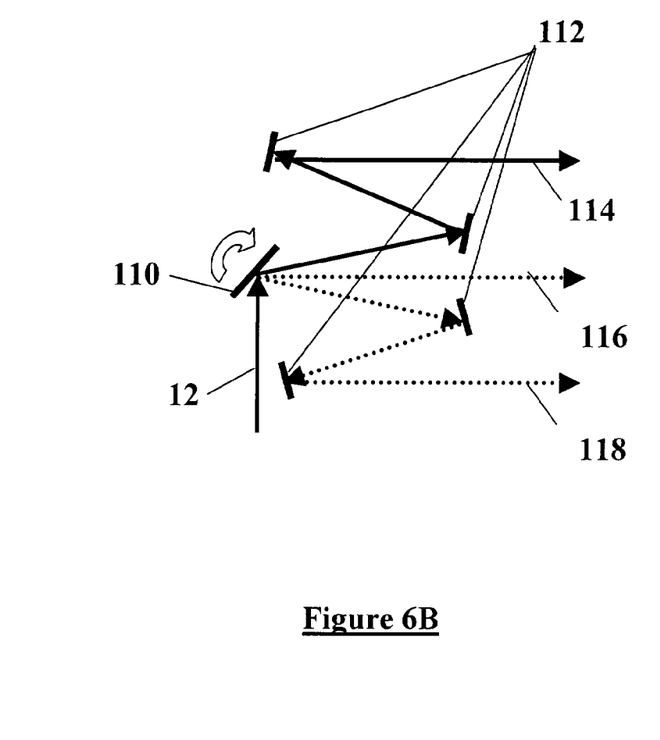

In the above exemplary embodiments, many different arrangements of components can be utilized to implement the time division multiplexer optical switch and the associated beam positioning optics required to locate the multiple intermediate beams. As illustrated in FIGS. 6A and 6B, one preferred embodiment employs addressable dispersive optical elements, such as gratings or prisms, to steer light angularly into separate optical waveguides or angled mirror arrays. The waveguides can be, for example, single-mode optical fibers, photonic crystal fibers, or another type of waveguide.

Referring to FIG. 6A, a source beam 12 enters an addressable dispersive element 98, such as an acousto-optic deflector, a liquid crystal display device, or a motor or galvanometer driven multi-faceted transmissive or reflecting grating. At a given time interval depicted here, the dispersive element 98 deflects the beam 12 so as to form an intermediate beam 100a that is directed to a beam shaping array 102 that can include appropriately positioned mirrors, or multi-faceted mirror array, or in the case shown, fiber waveguides consisting of an input optic 102a, a waveguide 102b and a re-collimating output optic 102c. The beam shaping array 102 generates an output beam 104a that can then be utilized, for example, to drive a non-linear element. In other time intervals, the dispersive element 98 can divert the beam into a different beam shaping array 106 to generate an output beam 104b, or another beam shaping array 108 to generate an output beam 104c. Each beam 104a, 104b, and 104c can then drive a nonlinear optical element disposed in its associated optical channel.

Another preferred embodiment utilizes a moving mirror element, e.g. a galvanometer-driven mirror, a spinning polygon mirror, a micro-machined mirror array device, etc. to deflect an input beam into separate optical waveguides or angled mirror arrays. For example, with reference to FIG. 6B, during a given time interval, a moving mirror element 110 deflects an input beam 12 to a multi-faceted mirror array 112 to produce an output beam 114 at a specified channel location. During another time interval, the moving mirror element 110 can deflect the input beam 12 to the multi-faceted mirror array to generate another output beam, such as beams 116 or 118.

The approach of employing a multi-faceted reflective grating to steer an input beam through a mirror array provides distinct advantages. For example, its operation is less sensitive to the wavelength (and timing of the input light pulse if the source is pulsed) and it is less susceptible to optical damage when high peak power levels are present in the input beam.

Figure 7:
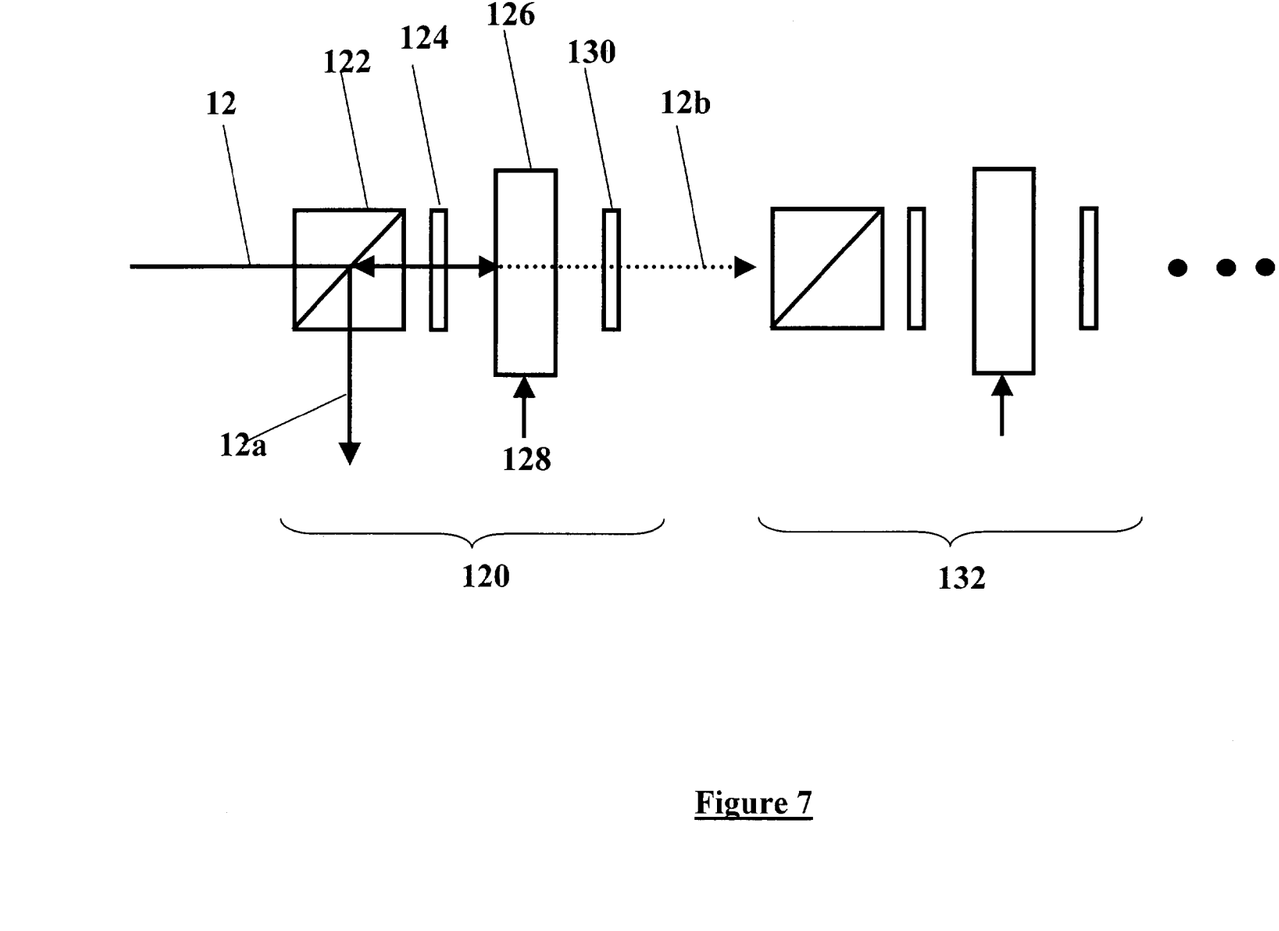

FIG. 7 depicts another exemplary implementation of a time division multiplexer optical switch 120 suitable for use in the practice of the invention. An input beam 12 has a linear polarization such that it passes through a polarizing beam splitter 122 to a +0.25 wave retarder plate 124 to strike a switchable mirror device 126. The mirror device 126 can change from reflecting to transmitting under command of control signal 128. Such a switchable mirror device can be formed, for example, by using electro-optical crystals such as lithium niobate supplied with a bias voltage and polished to form a tunable Fabry-Perot cavity. As shown in FIG. 7, when the switchable mirror 126 reflects, the beam passes back through retarder 124 and is polarized to be reflected by the beamsplitter 122 to form an outgoing beam 12a. When the switchable mirror transmits, the beam passes through another −0.25 wave retarder plate 130 to restore the polarization in an exit beam 12b to a state compatible with a cascading arrangement of the switch 120 and a similar switch 132. The cascading arrangement can be repeated to generate multiple beams.

Another application of the teachings of the invention relates to the field of fluorescence spectroscopy in which multiple optical "channels" are typically desired. Fluorescence spectroscopy can be particularly useful in characterization of biological samples. Many biological samples have naturally-occurring (endogenous) fluorophores which fluoresce at widely different excitation wavelengths. For example, aromatic amino acids, such as tryptophan, fluoresce when excited by radiation having wavelengths between about 250 nm and 295 nm, while reduced nicotinamicle adenine dinucleotide (NADH) fluoresces when excited by radiation having wavelengths between about 330 and 370 nm. Wavelengths in both of these bands can be conveniently generated according to the present invention by time division multiplexing radiation corresponding to the third (355 nm) and fourth (266 nm) harmonics of a pulsed Nd:YAG laser. In this manner, the ratios of endogenous fluorophores in a biological sample and other characteristics such as their lifetimes can be conveniently and rapidly be measured.

Figure 8:
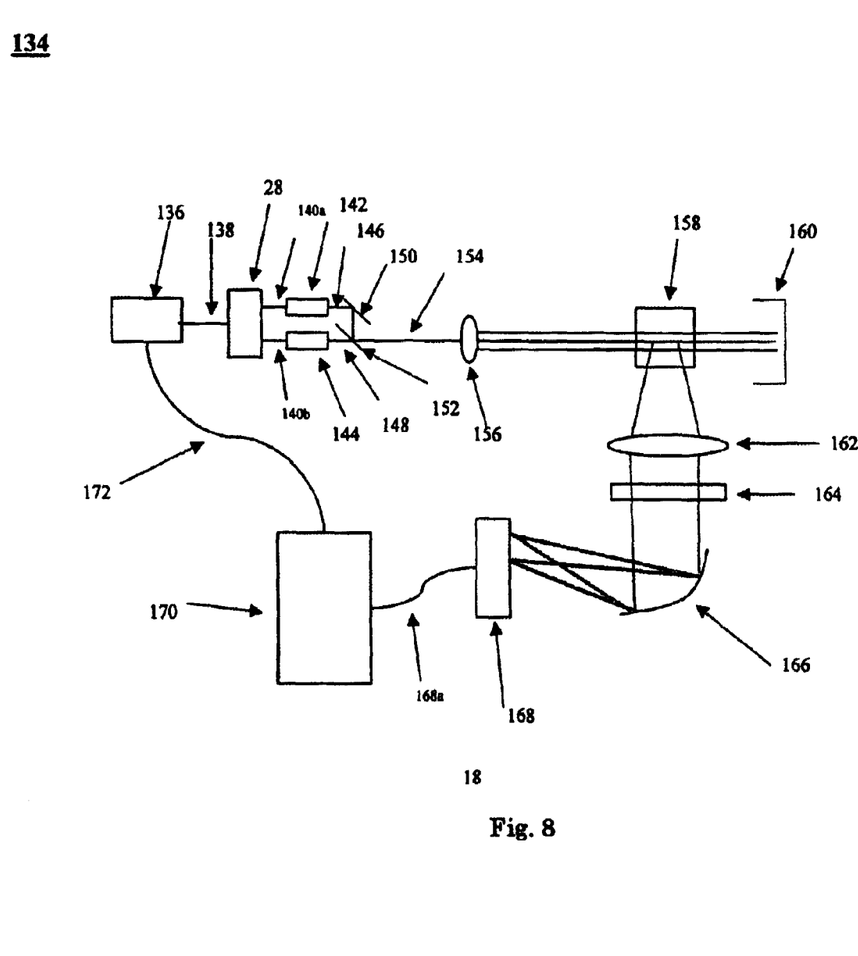

FIG. 8 schematically depicts an exemplary embodiment of a time-multiplexed fluorescence device (spectrometer) 134 according to the teachings of the invention that can provide an incident beam for illuminating a fluorescent sample at two different wavelengths, with the wavelengths separated in time. More particularly, a pulsed laser 136 emits a pulsed beam of light 138 having a wavelength of about 1064 nm. The pulse rate can be relatively low, preferably between 4000 and 8000 Hz. The beam 138 enters a time division multiplexer optical switch 28 according to the teachings of the invention that can utilize any of the methods previously discussed for time multiplexing the beam. Two separated time-division multiplexed (TDM) beams 140a and 140b emerge from the TDM switch 28, and are directed, respectively, into a third harmonic generator 142 and a fourth harmonic generator 144. The third harmonic generator 142 provides an output beam 146 having a wavelength component at 355 nm, and the fourth harmonic generator generates an output beam 148 having a wavelength component at 266 nm. The time-division multiplexing of the beam 138 allows driving the non-linear harmonic generators 142 and 144 at higher light intensities, thereby improving the efficiency of harmonic generation relative to prior art systems in which intensity division (beamsplitting) techniques are typically employed. The output beams 146 and 148 also include wavelength components corresponding to the original wavelength, namely, 1064 nm, as the efficiency of the non-linear harmonic generation is not 100 percent. This 1064 nm radiation component may be eliminated by suitable coatings on a turning mirror 150 and a dichroic combiner 152, and/or the insertion of an absorptive filter into the beam path.

The turning mirror 150 and the dichroic combiner 152 direct the beams 146 and 148 into a common propagation direction, that is, they re-combine the beams, thus generating a single beam 154 that contains pulses of light with both 266 and 355 nm wavelength components. The beam 154 is incident on a beam expander 156 that expands the combined beam, and transmits the expanded beam into a chamber 158 in which a sample under examination can be disposed, and finally to a beam stop 160. Fluorescence elicited from the sample in the sample chamber in response to excitation by the expanded beam can then be captured by a lens 162 and passed through a filter 164 that is designed to remove the wavelength components of the excitation light scattered by the sample in the direction of the lens 162. In one embodiment, the filter 164 includes two stacked static notch filters at 266 and 355 nm. In another embodiment, the filter 164 can be formed of a moving filter wheel in which appropriate long pass filters are paired with incident excitation beams.

A grating 166 disperses the emitted fluorescent light and focuses it onto a photomultiplier tube array (PMT) 168. The output of the PMT array 168 is sent to a processing electronics module 170, for example, via a connector 168a, which can also receive a timing pulse from the laser 136, for example, via a connection 172, to enable measurements of fluorescence lifetime as well as intensity. Since the pulse rate of the combined incident beam 154 is no higher than the original pulse rate, the electronics module 170 need not have more capacity than would be the case for a monochromatic excitation beam incident on the sample.

Although a beam combiner is utilized in the above exemplary embodiment of a multi-wavelength spectrometer according to the invention for directing the excitation beams as a combined beam onto a sample, in other embodiments, each excitation beam can propagate along a different path and be directed onto sample by employing an arrangement of optical elements, e.g., lenses and mirrors, in a manner known to those having ordinary skill in the art. Alternatively, in embodiments in which more than two excitation beams are utilized, some of these beams can propagate to the sample as one or more combined beams while the others propagate independently to the sample.

Although two non-linear elements generating two different wavelengths are utilized in the above exemplary spectrometer according to one aspect of the teachings of the invention, those having ordinary skill in the art will appreciate that three or more non-linear elements, each optically coupled to the time-division multiplexer, can be utilized in an spectrometer of the invention for generating more than two excitation wavelengths, or wavelengths differing from the third and fourth harmonics of Nd:YAG. For example, aromatic amino acids exhibit strong absorption in the region around 220 nm, and the fifth harmonic of Nd:YAG can be used to excite them. An instrument exploiting this fact can have three non-linear optical channels, at 213, 266, and 355 nm.

Other embodiments and uses of the invention will be apparent to those skilled in the art from consideration of the specification and practice of the invention disclosed herein. It is intended that the specification and examples be considered exemplary only. In particular, it should be noted that number of optical channels utilized in a system of the invention is not limited to those described in the above exemplary embodiments. In fact, the advantages of a system of the invention over prior art systems increases dramatically as the number of optical channels and the associated optical beams increases. As the beams are re-combined in the receiver, the detection and processing electronics of the present invention stays constant, unlike in prior-art systems, where it increases as the number of beams.

All references cited herein for any reason, including all U.S. and foreign patents and patent applications, are specifically and entirely incorporated by reference.

What is claimed is:
1. An optical system, comprising
    a source of radiation,
    an optical time-division multiplexer receiving radiation from said source, a plurality of optical channels optically coupled to said multiplexer, at least one of said optical channels having a non-linear optical element, and a controller in communication with said multiplexer, for each of a plurality of time intervals, said controller causing the multiplexer to shift said received radiation to a selected one of said optical channels.

2. The optical system of claim 1, wherein said radiation source generates a plurality of temporally separated optical pulses.

3. The optical system of claim 2, wherein said multiplexer deflects each of said pluses to a selected one of said optical channels based on an arrival time of said pulse at said multiplexer.

4. The optical system of claim 1, further comprising a plurality of detectors, each of said detectors being optically coupled to one of said channels to detect radiation transmitted therethrough.

5. The optical system of claim 1, wherein at least one of said non-linear optical elements comprises a second harmonic frequency doubler.

6. The optical system of claim 1, further comprising a beam combiner optically coupled to said optical channels so as to direct light transmitted through any of said channels into a common direction, thereby generating a combined beam.

7. The optical system of claim 6, further comprising a detector optically coupled to said beam combiner to detect said combined beam.

8. The optical system of claim 1, wherein said radiation source comprises a laser.

9. An optical system, comprising a source of radiation, an optical time-division multiplexer receiving radiation from said source, a plurality of optical channels optically coupled to said multiplexer, at least one of said optical channels having a non-linear optical element, and a controller in communication with said multiplexer, for each of a plurality of time intervals, said controller causing the multiplexer to shift said received radiation to a selected one of said optical channels, and wherein said multiplexer comprises an addressable dispersive element, and a plurality of beam shaping arrays optically coupled to said dispersive element, for each of said plurality of time intervals, the dispersive element deflecting radiation from said source into one of said beam shaping arrays to generate an output beam for coupling into one of said optical channels.

10. The optical system of claim 9, wherein said addressable dispersive element comprises any of an acousto-optic deflector or a reflecting grating.

11. A method of distributing radiation to a plurality of optical channels, at least one of which includes a non-linear optical element, comprising directing the radiation to an optical time-division multiplexer configured to divert the radiation, for each of a plurality of time intervals, into one of said optical channels so as to generate a plurality of optical pulses each traveling through one of said optical channels and each having a peak intensity substantially equal to a peak intensity of the radiation incident on the multiplexer.

12. The method of claim 11, further comprising selecting the non-linear elements to be frequency doublers.

13. The method of claim 12, further comprising re-directing each of said pulses traveling through said optical channels into a common optical path.

14. The method of claim 13, further comprising detecting said pulses along said common optical path.

15. The method of claim 14, wherein said detecting step further comprises utilizing a photo-electric detector to detect said pulses.

* * * * *